US006947401B2

(12) United States Patent
El-Malki et al.

(10) Patent No.: US 6,947,401 B2
(45) Date of Patent: Sep. 20, 2005

(54) HIERARCHICAL MOBILITY MANAGEMENT FOR WIRELESS NETWORKS

(75) Inventors: Karim El-Malki, Rome (IT); Hesham Soliman, Melbourne (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 812 days.

(21) Appl. No.: 09/784,072

(22) Filed: Feb. 16, 2001

(65) Prior Publication Data

US 2001/0046223 A1 Nov. 29, 2001

Related U.S. Application Data

(60) Provisional application No. 60/187,870, filed on Mar. 8, 2000.

(51) Int. Cl.[7] .............................................. H04Q 7/00
(52) U.S. Cl. ........................ 370/331; 370/338; 455/436
(58) Field of Search ................................ 370/331, 328, 370/330, 338, 349, 389, 392, 400, 401, 912, 913; 455/432.1, 436; 379/900

(56) References Cited

U.S. PATENT DOCUMENTS

| | | | | |
|---|---|---|---|---|
| 6,434,627 B1 | * | 8/2002 | Millet et al. | 709/245 |
| 6,466,964 B1 | * | 10/2002 | Leung et al. | 709/202 |
| 6,496,505 B2 | * | 12/2002 | La Porta et al. | 370/392 |
| 6,515,974 B1 | * | 2/2003 | Inoue et al. | 370/331 |
| 6,578,085 B1 | * | 6/2003 | Khalil et al. | 709/241 |
| 6,691,227 B1 | * | 2/2004 | Gopal et al. | 713/162 |

FOREIGN PATENT DOCUMENTS

WO  00/54475 A1  9/2000

OTHER PUBLICATIONS

Suh et al.; "System and Method for Supporting Mobility of Mobile Node Using Regional Anchor Point in Future Internet"; Jun. 3, 2004; United States Patent Application Publication.*

Oka et al.; "Mobile Communication Network System"; Mar. 11, 2004; United States Patent Application Publication.*

Choi et al.; "Method of Forming A Local Mobility Domain and A Local Mobility Agent and System and Apparatus Thereof"; Feb. 20, 2003; United States Patent Application Publication.*

Kin Weng Ng; Leung, V.C.M.; "An IPv6–based location management scheme for client–server computing over mobile data networks"; Sep. 21–24, 1999; Wireless Communications and Networking Conference, 1999. WCNC. 1999 IEEE; pp. 525–529 vol. 1.*

H. Soliman: "Hierarchical MIPv6 Mobility Management"; Network Working Group (Online); Sep. 2000, XP002901801, pp. 1–16.

Perkins C E: "Mobile Networking Through Mobile IP"; IEEE Internet Computing, vol. 2, No. 1, Jan. 1998–Feb. 1998, pp. 58–69.

Perkins C E et al: "Mobility Support In IPv6"; Proceedings of the Second Annual International Conference on Mobile Computing and Networking, Nov. 10–12, 1996, XP002901803, pp. 1–11.

PCT International Search Report Issued Jul. 31, 2001.

* cited by examiner

Primary Examiner—Chau Nguyen
Assistant Examiner—Joshua Kading

(57) ABSTRACT

Methods and apparatus for providing a hierarchical mobility management function for routing packets to mobile nodes are provided. The hierarchical mobility management function may be placed anywhere within the network and provide efficient use of IPv6 addresses. A node implementing the hierarchical mobility management function receives packets intended for the mobile node and routes the packets to the mobile node's current address. Load sharing of packets intended for a mobile node may be implemented across several access routers. Additional, bi-casting of packets is provided to allow for seamless handoff of the mobile node as it switches from one access router to another access router.

28 Claims, 10 Drawing Sheets

FIG. 5

| TYPE | LENGTH | HOPS | PREFERENCES |
|---|---|---|---|
| VALID LIFETIME ||||
| GLOBAL IP ADDRESS FOR MAP ||||

FIG. 8

| OPTION TYPE | OPTION LENGTH |
|---|---|
| SEQUENCE NUMBER ||

| A | H | R | D | M | B | L | RES | PREFIX LENGTH |
|---|---|---|---|---|---|---|---|---|

LIFETIME

SUB-OPTIONS

HIERARCHICAL MOBILITY MANAGEMENT FOR WIRELESS NETWORKS

This application claims priority under 35 U.S.C. §119(e) to U.S. Provisional Application No. 60/187,870 filed on Mar. 8, 2000, the entire disclosure of which is herein expressly incorporated by reference.

FIELD OF INVENTION

The present invention involves the field of telecommunications. More particularly, the present invention involves the field of mobile telecommunications and the Mobile Internet Protocol.

BACKGROUND

The network-layer protocol associated with the Internet is appropriately called the Internet Protocol (IP). In general, the IP connects the various networks and subnetworks which make up the Internet by defining, among other things, the rules and procedures which govern the way IP data packets are routed from a source node to a destination node. To ensure that IP data packets are correctly routed, every node is assigned an IP address, wherein the IP address defines a fixed network location associated with a correspondent node. While IP adequately handles the routing of data between fixed network nodes, it does not adequately handle the routing of IP data packets to and/or from mobile nodes.

In contrast, the Mobile Internet Protocol (i.e., Mobile IP) was designed to specifically handle the routing of IP data packets to and/or from mobile nodes (i.e., mobile terminals which frequently change their point-of-attachment to the Internet). Moreover, Mobile IP was designed to handle the routing of IP data packets to and/or from mobile nodes without significantly interrupting on-going communications and without requiring mobile nodes to restart applications.

Mobile IP supports mobility, in part, by assigning two IP addresses to each mobile node, herein referred to as mobile terminals. The first of these IP addresses is known as the home address. The home address is a permanent IP address, and it is associated with a mobile terminal's point-of-attachment in the mobile terminal's home network. The second IP address is called the care-of-address. The care-of-address is assigned to a mobile node when the mobile node moves and attaches to a foreign network. Unlike the mobile terminal's home address, the care-of address is a temporary address. The care-of address is a temporary address because it changes whenever the mobile node undergoes a handover procedure from one point-of-attachment to another in a foreign network.

Presently, there are two versions of Mobile IP that have been proposed by the Internet Engineering Task Force (IETF): Mobile IP version 4 (MIPv4) and Mobile IP version 6 (MIPv6). FIG. 1 illustrates a conventional IPv4 network. The IPv4 network illustrated in FIG. 1 includes a mobile node 105, foreign agents 120, 125 and 130, a gateway foreign agent 135, the Internet 140, home agent 145 and correspondent node 155. To access correspondent node 155 through Internet 140, mobile node 105 attaches to a foreign agent. In mobile IP the access router may be co-located with a radio access point, although this need not be the case. When mobile node 105 is in an area of coverage of foreign agent 120, mobile node 105 attaches to foreign agent 120. The mobile node then sends a registration request to home agent 145 which indicates the current care-of-address of mobile node 105, which in this case is foreign agent 120. The registration request is sent from the mobile node 104 through foreign agents 120 and 130, gateway foreign agent 135 and Internet 140.

After the mobile node registers its new care-of address with home agent 145, the home agent is able to serve as a proxy for mobile node 105. Accordingly, IP data packets from correspondent node 155 which are addressed to the mobile node 105 (i.e., the mobile terminal's home address) will be intercepted by the home agent 145. The home agent 145 then encapsulates the IP data packet so that the destination address reflects the mobile terminal's care-of-address, i.e., the address of foreign agent 120. The data packet is then sent from the home agent 145 to the foreign agent 120. When the IP data packet arrives at foreign agent 120, the IP data packet is retransformed or de-capsulated by stripping away the external IP header so that the mobile node's home address once again appears as the destination address. The IP data packet can then be delivered to the mobile node, wherein the data contained therein can be processed by the appropriate higher level protocols (e.g., TCP or UDP), as one skilled in the art will readily appreciate.

There are a number of drawbacks associated with MIPv4. For example, network nodes generally have no way of knowing whether another node is a mobile node. Accordingly, if they wish to send IP data packets to another node, they must always do so by indirectly sending IP data packets through the other node's home address, as explained above. This indirect routing of IP data packets adds delay to the IP data packet routing process, wherein excessive delay can be extremely detrimental to delay-sensitive applications, such as voice applications. In addition, care-of-address allocation is often problematic due to the limited number of available care-of-addresses.

MIPv6 includes several features that were designed to overcome some of the deficiencies associated with MIPv4. One such feature, for example, is called route optimization. FIG. 2 illustrates an exemplary MIPv6 network. The MIPv6 network of FIG. 2 includes mobile node 205, access routers 210, 215, 220, 230 and 250, correspondent nodes 225 and 235, home agent 245, and Internet 240. It will be recognized that nodes 225 and 235 are referred to as correspondent nodes since they are communicating with the mobile node 205. In accordance with the route optimization feature, MIPv6 compatible nodes, e.g., correspondent nodes 225 and 235 and home agent 245, maintain a list which provides a mapping between a home address of mobile node 205 and a corresponding care-of-address for mobile node 205. This list is maintained in, what is referred to as, a binding cache. If mobile node 205 changes its point of attachment from access router 210 to access router 215, it sends a binding update message to home agent 245 and correspondent nodes 225 and 235. Upon receiving the binding update message, home agent 245 and correspondent nodes 225 and 235 use the information contained in the binding update message to update their binding cache. Correspondent nodes 225 and 235 are then able to send IP data packets directly to the mobile node 205 (i.e., to the mobile terminal's care-of-address) without first having to route the IP data packets through the mobile terminal's home agent 245. As one skilled in the art will readily appreciate, route optimization is intended to reduce IP data packet routing delay times.

Despite numerous improvements over MIPv4, MIPv6 still exhibits numerous other deficiencies. One such deficiency is the lack of a hierarchical mobility management structure. A hierarchical mobility management structure can reduce signalling delay when a mobile node changes point of attachment. The reduced signalling delay results in faster handoffs from one point of attachment to the next point of attachment. For example, referring now to the MIPv4 network illustrated in FIG. 1, assume that mobile node 105 uses the Gateway Foreign Agent 135 as a global care-of-address which the mobile node has in its binding cache. Accordingly, mobile node 105 can change its point of attachment from foreign agent 120 to foreign agent 125 without having to send a binding update. In comparison, referring now to the MIPv6 scenario illustrated in FIG. 2, when mobile node 205 changes its point of attachment from access router 210 to access router 215, mobile node 205 must send binding updates to correspondent nodes 225 and 235 and to home agent 245.

U.S. patent application Ser. No. 09/264,860 "Multicast Hanover For Mobile Internet Protocol" filed on Mar. 9, 1999, which is herein expressly incorporated by reference, describes one method of providing a hierarchical mobility management structure in a MIPv6 compatible system. This patent application describes a hierarchical system which uses a mobility management agent (MMA) and multicasting to provide a more efficient intra-domain handoff. However, this system requires all networks to include IP multicast routing protocols. Furthermore, multicast routing can be very bandwidth inefficient which adds significant cost and reduces the network throughput.

Another hierarchical mobility management structure in a MIPv6 compatible system includes a number of mobility agents on different levels of the network hierarchy. Each mobility agent essentially performs the functions of a home agent as described in MIPv6. Each mobility agent has a pool of Virtual Care of Addresses (VCOA). When a mobile node enters a domain which includes a mobility agent, the mobile node acquires a number of VCOAs. The mobile node registers with each mobility agent using its VCOA. When a packet is sent to the mobile node from a correspondent node, the packet arrives at the top level mobility agent. The top level mobility agent will encapsulate the packet to the next mobility agent below it in the hierarchy which will then decapsulate the packet and encapsulate the packet again and pass it down to the next mobility agent in the hierarchy. This process is repeated until the packet reaches the mobile node. Using this hierarchical structure the hierarchical functionality of MIPv4 is effectively mapped onto the MIPv6 environment. However, due to the requirement that each mobility agent must decapsulate and encapsulate each packet a significant delay can be added to the arrival time. Further, the assignment of a number of VCOAs is inefficient in terms of address allocation management since the allocated addresses are of little use to the mobile node. In addition, tunneling the packets between the mobility agents blocks the use of standard routing protocols and optimum routing of the packets may not be achieved.

Accordingly, it would be desirable to provide hierarchical mobility management for wireless networks. It would also be desirable to provide hierarchical mobility management for networks which operate in accordance with MIPv6.

SUMMARY OF THE INVENTION

The present invention provides a technique for routing packets to a mobile node. In accordance with one embodiment of the present invention an address update is provided to a node communicating with the mobile node. Packets are sent from the node communicating with the mobile node to a node associated with the updated address. The packets are received at the node associated with the updated address which determines the current address of the mobile node. The received packets are routed to a node associated with the current address of the mobile node. The node associated with the current address for the packets to the mobile node.

In accordance with one aspect of the present invention, the packets are sent between the node communicating with the mobile node and the mobile node in accordance with mobile Internet Protocol version 6 (MIPv6). 20 In accordance with another aspect of the present invention the node associated with the updated address implements mobility anchor point functionality and the node associated with the current address is an access router.

BRIEF DESCRIPTION OF THE FIGURES.

The objects and advantages of the present invention will be understood by reading the following detailed description in conjunction with the drawings in which:

FIG. 5 illustrates a mobility anchor point option in accordance with exemplary embodiments of the present invention;

FIG. 8 illustrates a binding update message in accordance with exemplary embodiments of the present invention;

DETAILED DESCRIPTION OF THE INVENTION

In the following description, for purposes of explanation and not limitation, specific details are set forth, such as particular nodes, message formats, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
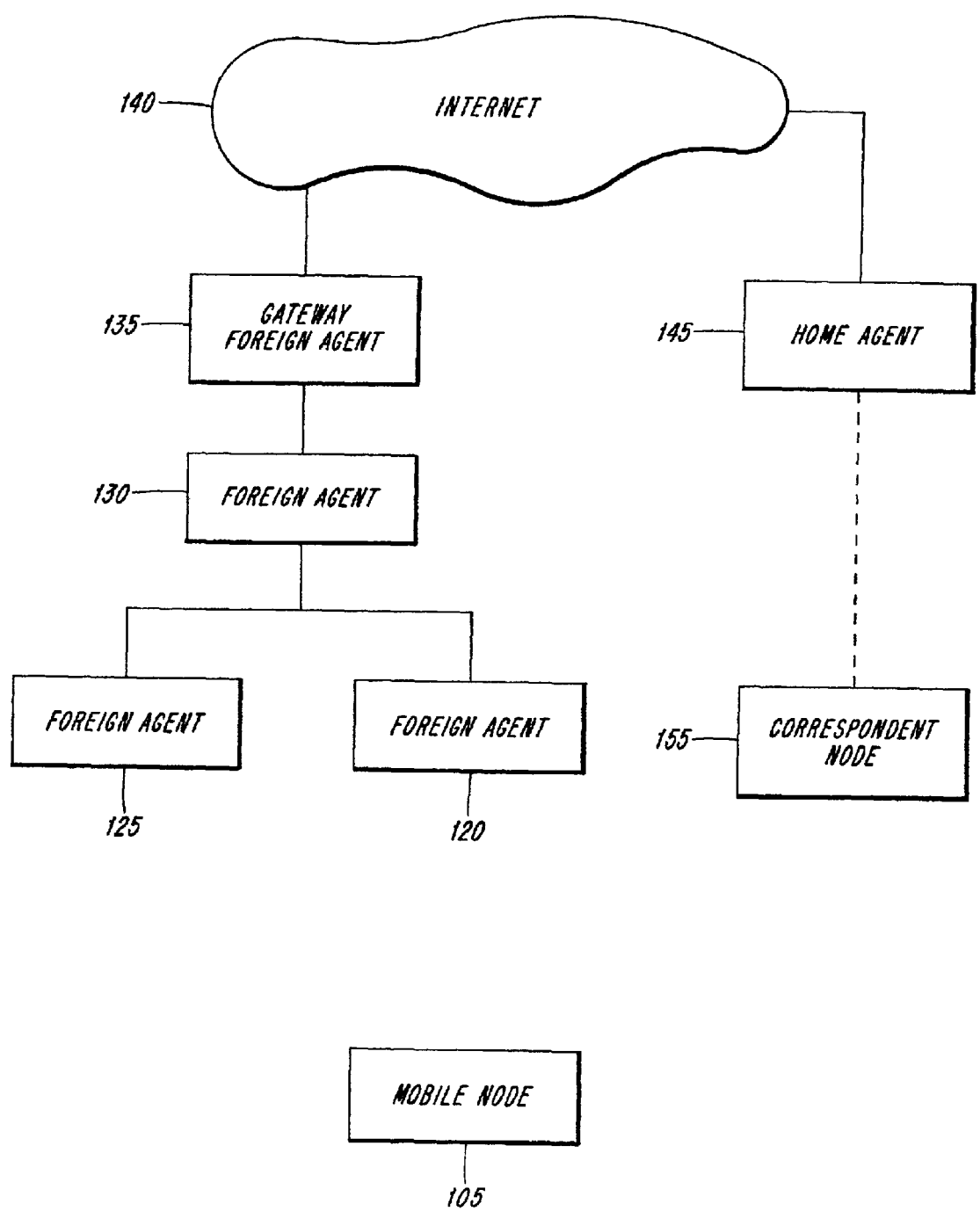
FIG. 1 illustrates a conventional MIPv4 network.
Figure 2:
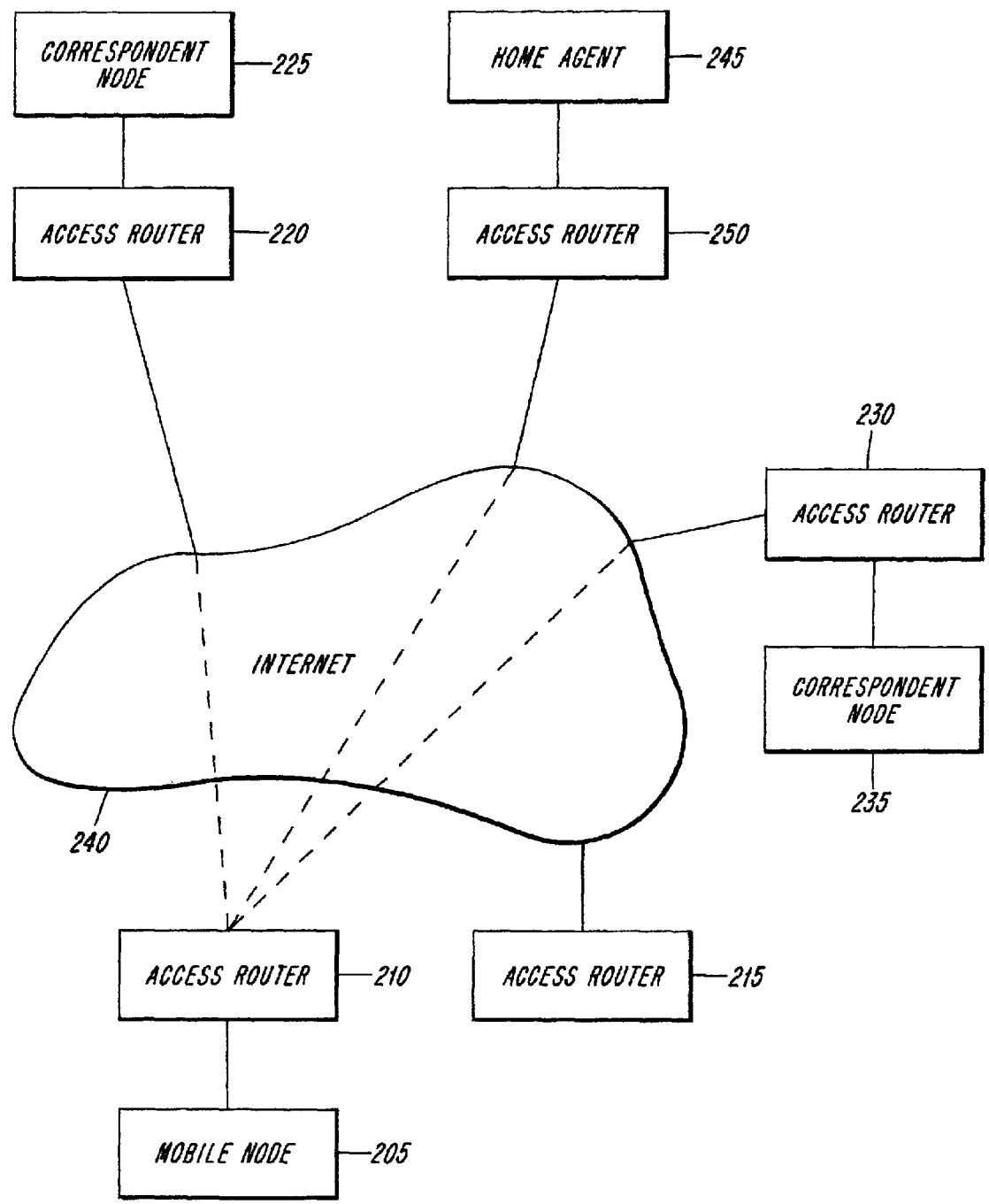
FIG. 2 illustrates a conventional MIPv6 network.
Figure 3:
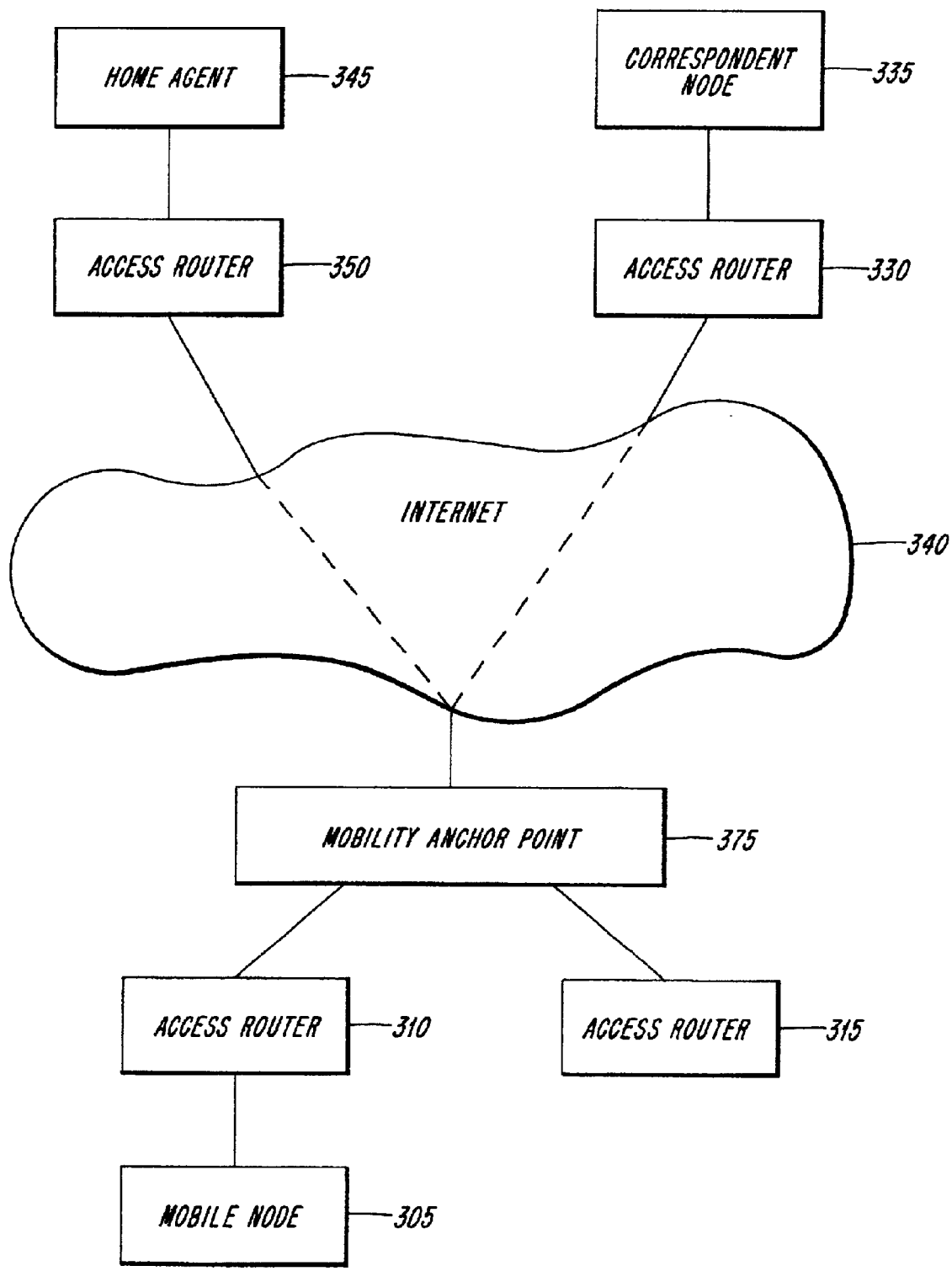
FIG. 3 illustrates a network which uses a mobility anchor point (MAP) in accordance with exemplary embodiments of the present invention.

FIG. 3 illustrates a network including a mobility anchor point in accordance with exemplary embodiments of the present invention. The network illustrated in FIG. 3 includes mobile node 305, correspondent node 335, access routers 310, 315, 330 and 350, Internet 340, home agent 345, and mobility anchor point 375. It should be recognized that the mobility anchor point is a functionality rather than a physical node, and hence, mobility anchor points can be located anywhere within the network, e.g., within access routers 310 and 315. The placement of mobility anchor point 375 above access routers 310 and 315 allows mobile node 305 to change its point of attachment from access router 310 to access router 315, and vice versa, without requiring mobile node 305 to update its care-of-address with home agent 345 and correspondent node 335.

One of the main differences between MIPv6 and MIPv4 is that the access routers in MIPv6 are not required to support any mobility functionality. This invention removes the need for an N-level tree hierarchy of mobility agents. However, it should be noted that the N-level hierarchy can also be supported by this invention if desired. This invention supports an N-level hierarchy or a flexible placement of the mobility anchor point functionality anywhere in the network. This flexibility would allow the mobile node to register with more than one mobility anchor point node if necessary to speed up the recovery process in case of mobility anchor point failures.

In general there are three phases to the present invention, mobility anchor point discovery, binding updates and packet routing. The mobility anchor point discovery phase generally consists of providing indications, to mobile nodes, of the mobility anchor points which are accessible through a particular access router. Once a mobile node selects a particular mobility anchor point for its alternate-care-of-address, which is also referred to as the regional care-of-address (RCOA), the mobile node registers with the mobility anchor point using binding updates. This binding update communicates the mobile node's current location (i.e. the address obtained from the access router that is attached to, which is also referred to as the on-link care-of-address (LCOA)) and requests a binding between it and the mobile node's home address. After registering with the mobility anchor point the mobile node will then send binding updates to its home agent and to any correspondent nodes with which the mobile node is currently communicating with. These binding updates will bind the mobile node's home address to the RCOA, i.e., the mobility anchor point address. Hence the binding caches of all correspondent nodes and the home agent will include the mobility anchor point address as a care of address for the mobile node. Once the binding updates have been performed, packets are routed to the mobile node via the alternate care-of-address which corresponds to the mobility anchor point with which the mobile node had registered, i.e., the RCOA.

Figure 4:
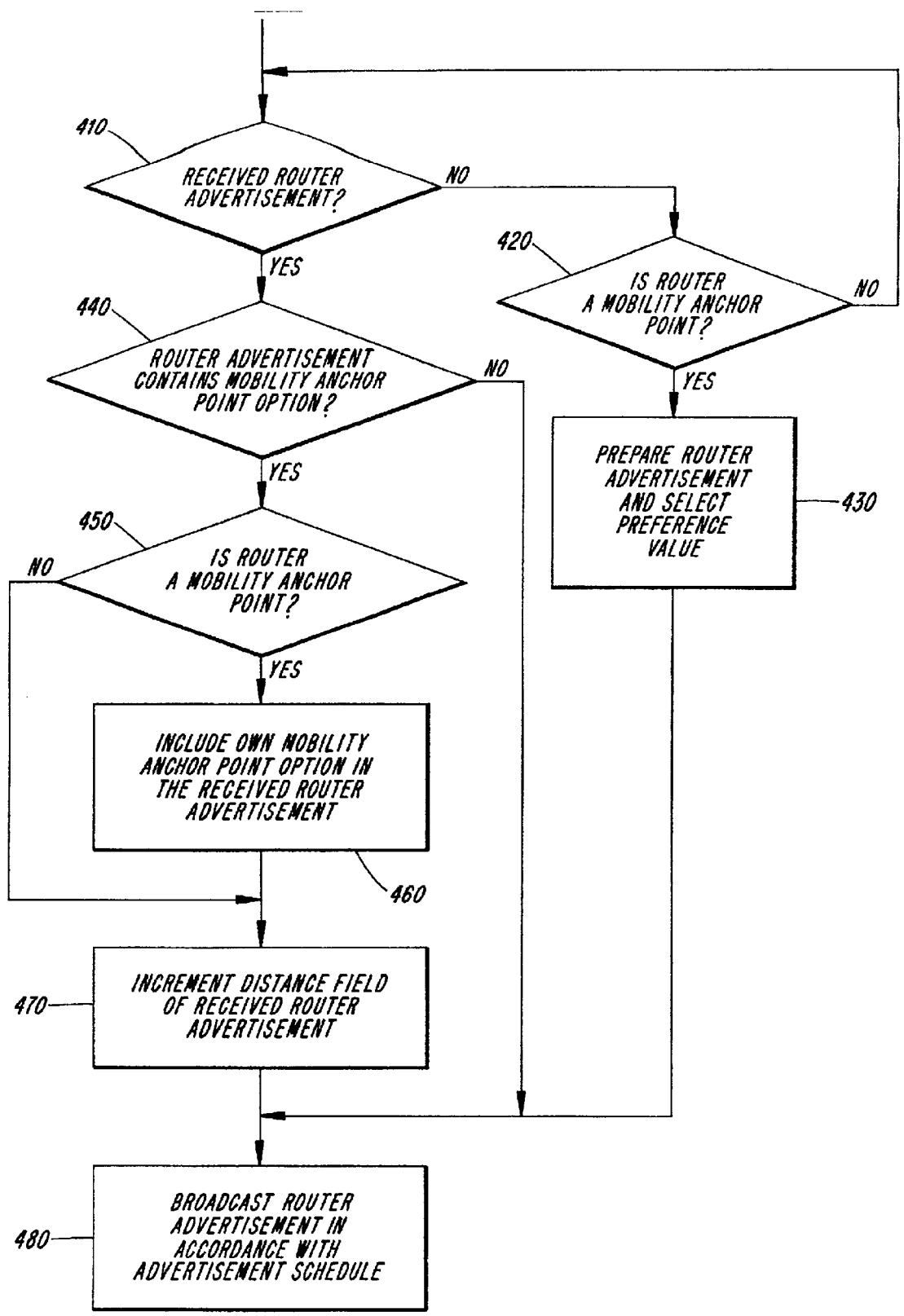
FIG. 4 illustrates a method for generating and processing router advertisements in accordance with exemplary embodiments of the present invention.

FIG. 4 illustrates an exemplary method for generating and processing router advertisements in accordance with the present invention. Initially, a router determines whether it has received a router advertisement (Step 410). If the router has not received a router advertisement ("No" path out of decision step 410) then the router determines whether it is a mobility anchor point (Step 420). If the router is not a mobility anchor point ("No" path out of decision step 420), the router continues to wait for received router advertisements (Step 410). If, however, the router is a mobility anchor point ("Yes" path out of decision step 420), the router prepares a router advertisement, selects a preference value for the router advertisement (Step 430) and broadcasts the router advertisement in accordance with an advertisement schedule (Step 480).

In accordance with exemplary embodiments of the present invention, router advertisements include a mobility anchor point option for indicating the availability of mobility anchor point functionality. FIG. 5 illustrates an exemplary mobility anchor point option in accordance with the present invention. The mobility anchor point option illustrated in FIG. 5 includes an 8 bit Type field, an 8 bit Length field, an 8 bit Distance field, an 8 bit Preference field, a 32 bit Valid Lifetime field and a 128 bit Global IP Address for MAP field. The following table describes the functions of the various parts of the mobility anchor point option message.

| Field | Description |
|---|---|
| Type | indicates that this option is MAP option |
| Length | includes an 8 bit unsigned integer which indicates the size of the option |
| Distance | indicates the virtual distance between the mobility anchor point and the mobile node. This may not necessarily equate to the number of hops away from the mobile node. The use of the distance field by mobility anchor points should be consistent within an administrative domain |
| Preferences | contains an 8 bit unsigned integer which indicates the preference to be accorded by a receiver of the router advertisement to the mobility anchor point included in the advertisement. In accordance with exemplary embodiments of the present invention a value of 255 in the Preferences field is the lowest priority value |
| Valid Lifetime | contains a 32 bit unsigned integer which indicates the number of seconds remaining before the mobility anchor point option is to be considered expired |
| Global IP Address For MAP | contains the IP address of the particular mobility anchor point being advertised which is used by the mobile node as an alternate care-of-address, i.e., the RCOA |

Returning now to FIG. 4, if the router has received a router advertisement ("Yes" path out of decision step 410), then the router determines whether the router advertisement contains a mobility anchor point option (Step 440). If the router advertisement does not contain a mobility anchor point option ("No" path out of decision step 440), then the router broadcasts the router advertisement in accordance with an advertisement schedule (Step 480).

If the router advertisement contains a mobility anchor point option ("Yes" path out of decision step 440), then the router determines whether it is a mobility anchor point (Step 450). If the router is a mobility anchor point ("Yes" path out of decision step 450), then the router includes its own mobility anchor point option in the received router advertisement (Step 460). After the router has included its own mobility anchor point option in the router advertisement (Step 460), or if the router is not a mobility anchor point ("No" path out of decision step 450), the router increments the distance field in the mobility anchor point option in the received router advertisement (Step 470) and broadcasts the router advertisement in accordance with the advertisement schedule (Step 480).

Although the method which is described above broadcasts router advertisements in accordance with a advertisement schedule, it will be recognized that since the network is aware of the status of the mobile node, the network may only send router advertisements when needed. For example, in cellular networks the network is aware when a mobile node attaches to it. This awareness is based on the knowledge acquired from the radio technology being used. Hence, based on the knowledge, a trigger from layers lower than the IP layer, can inform the access router that a mobile node has attached and hence initiate the sending of a router advertisement. This does not replace the normal inter-advertisement interval mentioned earlier, but allows these triggered advertisements to be sent specifically to mobile nodes that need them. Scheduled router advertisements can also be sent in the meantime.

Further, it will be recognized that each router within a mobility anchor point domain will be configured to relay the mobility anchor point option on certain (configured) interfaces by adding such option to its own router advertisement. Each router receiving the option and relaying must increment the Distance field by one. By following this procedure, the mobility anchor point option will be propagated to the mobile node with the appropriate parameters. A mobility anchor point may resend its own option with a different preference value subject to node loading, partial failures or changes in local policies within the domain.

Figure 6:
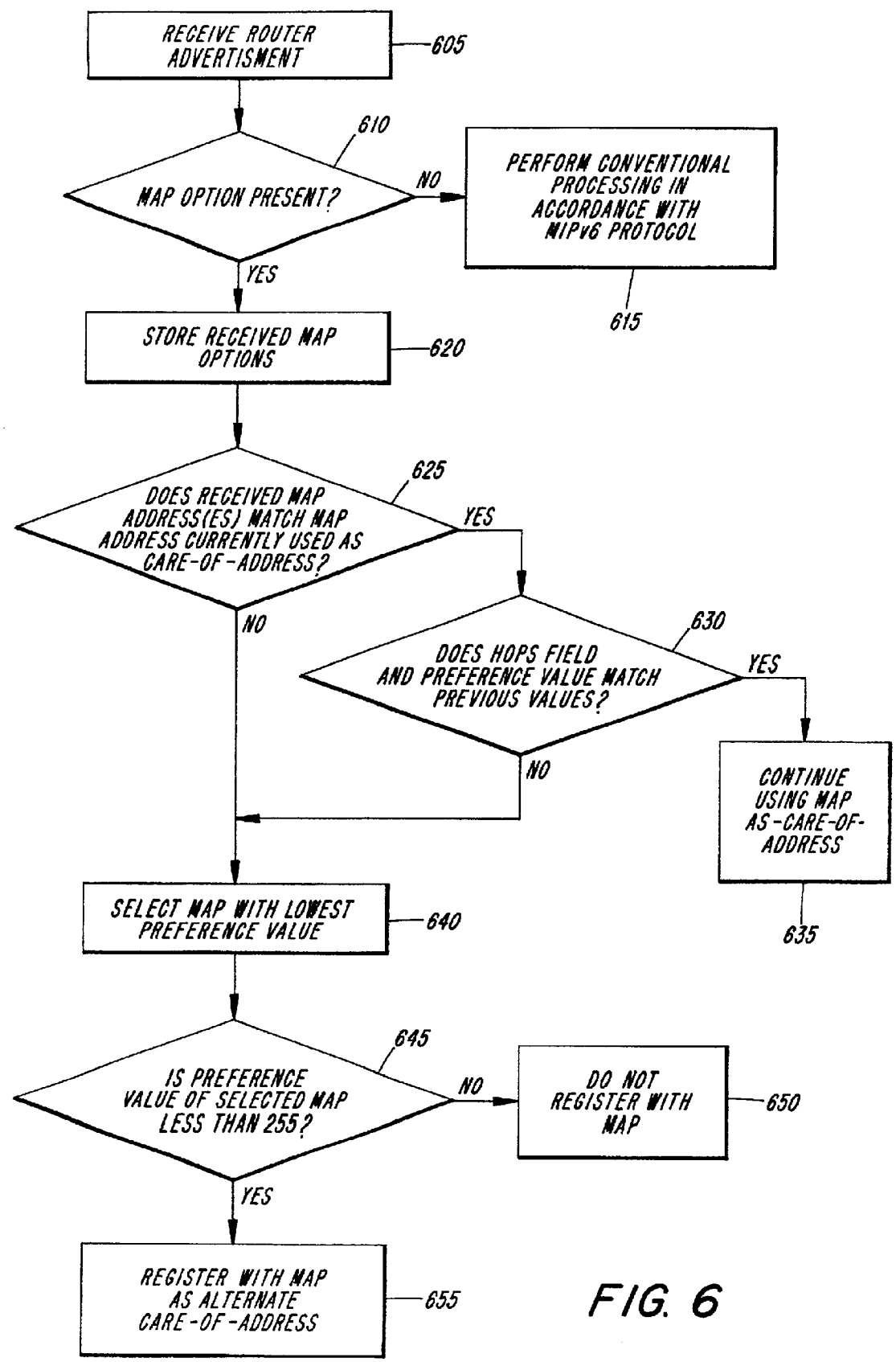
FIG. 6 illustrates a method for processing of router advertisements by a mobile node in accordance with exemplary embodiments of the present invention.

FIG. 6 illustrates an exemplary method for processing router advertisements by a mobile node in accordance with the present invention. When a mobile node receives a router advertisement (Step 605) the mobile node determines whether there is a mobility anchor point option present in the router advertisement (Step 610). If the mobile node determines that there is not a mobility anchor point option in the router advertisement ("No" path out of decision step 610), then the mobile node processes the router advertisement in accordance with conventional MIPv6 protocol (Step 615).

If the mobile node determines that the mobility anchor point option is present in the received router advertisement ("Yes" path out of decision step 610), then the mobile node stores the received mobility anchor point option (Step 620). Next, the mobile node determines whether any of the received mobility anchor point addresses match the mobility anchor point address currently used by the mobile node as its alternate care-of-address (Step 625). If one of the received mobility anchor point addresses matches the currently used mobility anchor point address ("Yes" path out of decision step 625) the mobile node determines if the distance field value and preference value matches the previously stored values (Step 630). If the distance field values and preference values match the stored values ("Yes" path out of decision step 630) then the mobile node continues to use the currently used mobility anchor point as its alternate care-of-address (Step 635).

If none of the received mobility anchor point addresses matches the mobility anchor point address which is currently used by the mobile node as a alternate care-of-address ("No" path out of decision step 625) or if the distance field value and the preference value does not match those stored in the mobile node ("No" path out of decision step 630) then the mobile node selects the mobility anchor point with the lowest preference value (Step 640). Next the mobile node determines whether the preference value of the selected mobility anchor point is less than 255 (Step 645). It will be recognized that a mobility anchor point can prevent itself from being used by additional mobile nodes by setting its preference value to 255. If the preference value is not less than 255 ("No" path out of decision step 645), then the mobile node will not register with the mobility anchor point (Step 650). If, however, the preference value is less than 255 ("Yes" path out of decision step 645) then the mobile node registers with the mobility anchor point as its alternate care-of-address (Step 655).

Figure 7:
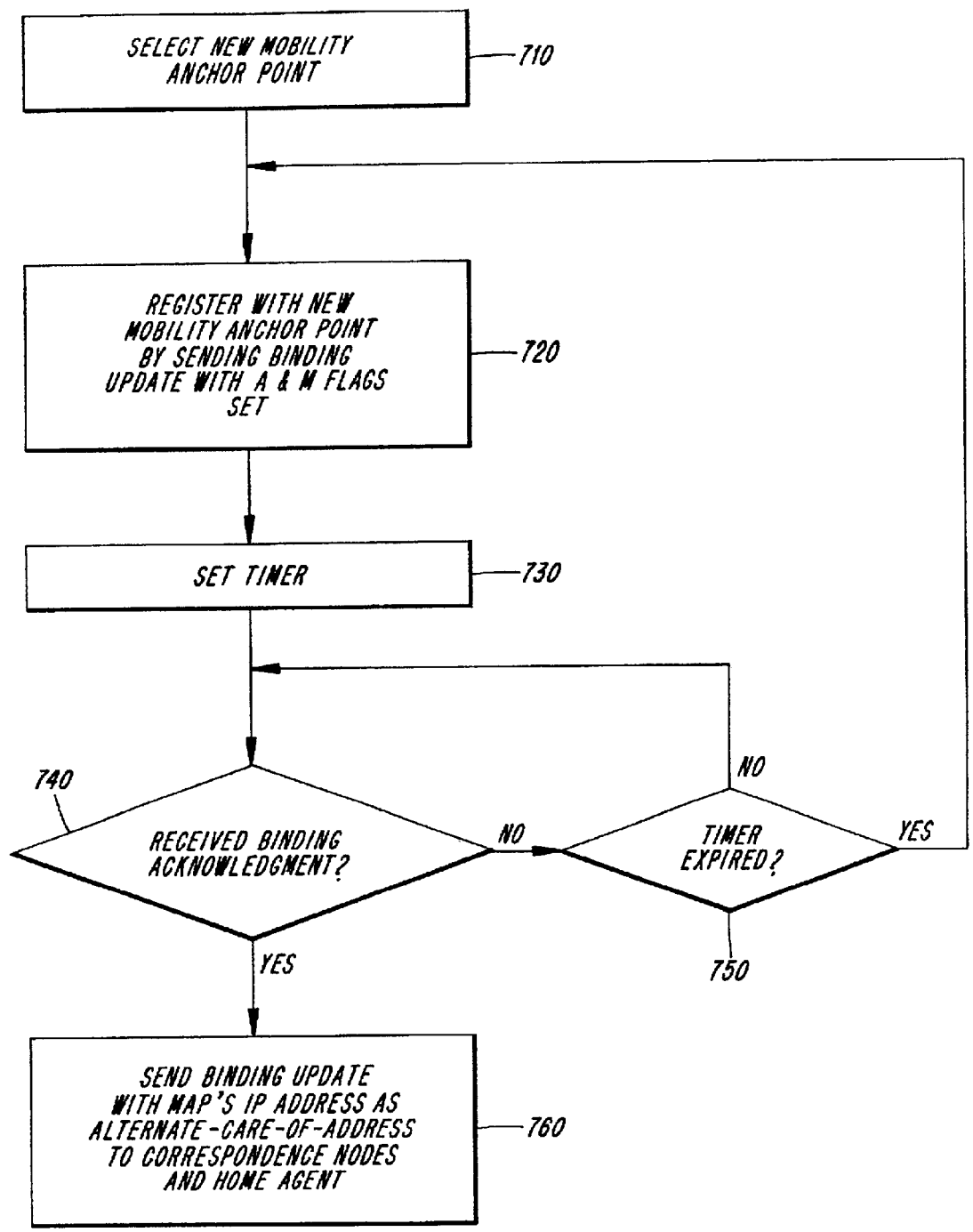
FIG. 7 illustrates a method for mobility anchor point registration in accordance with exemplary embodiments of the present invention.

Once a mobile node has selected a mobility anchor point with which the mobile node wishes to use as a alternate care-of-address, the mobile node registers with the mobility anchor point. FIG. 7 illustrates an exemplary method for registering with a mobility anchor point by a mobile node in accordance with the present invention. Accordingly, a mobile node selects a new mobility anchor point (Step 710) and registers with the new mobility anchor point by sending a binding update message with the "A" and "M" flags set (Step 720).

FIG. 8 illustrates a binding update in accordance with exemplary embodiments of the present invention. The binding update illustrated in FIG. 8 includes an Option Type field, an Option Length field, an Acknowledge (A) field, a Home Registration (H) field, a Router (R) field, a Duplicate Address Detection (D) field, a Mobility Anchor Point (M) field, a Bi-cast (B) field, a Load Sharing (L) field, a Reserved (Res) field, a Prefix Length field, a Sequence Number field, a Lifetime field and a Sub-Options field. One skilled in the art will recognize that the difference between a conventional binding update message and the binding update message illustrated in FIG. 8 is that the binding update message in FIG. 8 includes a Mobility Anchor Point (M) field, a Bi-cast (B) field and a Load Sharing (L) field. The following table describes the functions of the various fields contained in the binding update.

| Field | Description |
| --- | --- |
| Option Type | contains an 8 bit unsigned integer which indicates that the message is a binding update |
| Option Length | contains an 8 bit integer which indicates the length, in octets, of the option excluding the Option Type and Option Length fields. This field is set to 8 plus the total length of all sub-options present in the message, including the sub-option type and sub-option length fields (not illustrated) |
| Acknowledge (A) | contains a bit which is set by the sending mobile node to request a binding acknowledgement be returned upon receipt of the binding update |
| Home Registration (H) | contains a bit which is set by the sending mobile node to request the receiving node to act as this node's home agent. The destination of the packet carrying this option is a router sharing the same subnet prefix as the home address of the mobile node in the binding update, as provided by the Home Address field in the Home Address option in the packet |
| Router (R) | contains a bit which is set to indicate that the sending mobile node is a router. This bit is only valid when the Home Registration bit is also set. This bit is saved in the home agent's home registration binding cache entry for the mobile node and is copied into the corresponding bit in all proxy neighbor advertisement messages sent on behalf of this mobile node by the home agent using this binding cache entry |
| Duplicate Address Detection (D) | contains a bit which indicates that the sending mobile node is requesting that the receiving node (the mobile node's home agent) perform duplicate address detection on the mobile node's home link for the home address in the binding update. This bit is only valid when the Home Registration bit and Acknowledge bit are set. If duplicate address detection performed by the home agent fails, the Status field in the returned binding acknowledgement message will be set to a value of 138 which indicates that duplicate address detection has failed |
| Mobility Anchor Point (M) | contains one bit which indicates a new mobility anchor point registration for the mobile node sending the binding update |
| Bi-cast (B) | contains one bit which indicates that the mobile node sending the binding update is requesting that binding must be added to the receiver's binding cache without removing any of the previous addresses. All received packets will be n-cast to previous and current addresses in the mobility anchor point's binding cache |
| Load Sharing (L) | contains one bit which indicates that packets intended for the mobile node are to be distributed across different care-of-addresses. To implement load sharing both the load sharing and bi-casting bits should be set |
| Reserved (Res) | a one bit field which is currently unused. This field is initialized to zero by the send and is ignored by the receiver |
| Prefix Length | contains an eight bit value which is used only for home registration binding updates. If the Home Registration (H) bit is not set in the binding update then this field is set to zero. The Prefix Length field is set by the sending mobile node to the length of its subnet prefix in its home |

-continued

| Field | Description |
|---|---|
| | address, which is provided in the Home Address option in the binding update, to request its home agent to use the interface identifier in the mobile node's home address, i.e., the remaining low-order bits after the indicated subnet prefix, to form all other home addresses for the mobile node on the home link. The home agent then becomes the home agent not only for the individual home address given in the binding update, but also for all other home addresses for this mobile node formed from this interface identifier, i.e., for each on-link prefix on the home link, the home agent uses the interface identifier to form other valid addresses for the mobile node on the home link, and acts as a home agent also for those addresses. In addition, the home agent forms the link-local address and the site-local address corresponding to this interface identifier, and defends each for purposes of Duplicate Address Detection. The home agent also performs Duplicate Address Detection on each such address as part of the home registration processing, if the Duplicate Address Detection (D) bit is set in the binding update |
| Sequence Number | contains 16 bits which are used by the receiving nodes to sequence binding updates and by the sending node to match a returned binding acknowledgement with this binding update. Each binding update sent by a mobile node uses a sequence number greater than the sequence number value sent in the previous binding update (if any) to the same destination address |
| Lifetime | contains a 32 bit unsigned integer which indicates the number of seconds remaining before the binding update is considered to be invalid. A value of all one bits in this field indicates that the binding update does not expire. A value of zero in this field indicates that the binding cache entry for the mobile node should be deleted by the receiver |
| Sub-Options | contains additional information associated with the binding update. If no Sub-Options are included in the binding update this field need not be included in the binding update. Examples of Sub-Options include the Unique Identifier sub-option and the Alternate Care-Of-Address sub-option |

Referring again to FIG. 7, after the mobile node sends a binding update to the mobility anchor point the mobile node sets a timer (Step 730) and determines whether a binding acknowledgment has been received from the mobility anchor point (Step 740). If it is determined that a binding acknowledgement has not been received by the mobile node ("No" path out of decision step 740) then the mobile node determines whether the timer has expired (Step 750). If the timer has not expired ("No" path out of decision step 750) then the mobile node continues to determine whether it has received a binding acknowledgment (Step 740). If, however, the mobile node determines that the timer has expired ("Yes" path out of decision step 750) then the mobile node will make another attempt to register with the mobility anchor point by sending a binding update (Step 720).

If the mobile node has received a binding acknowledgement ("Yes" path out of decision step 740) then the mobile node sends binding updates with the mobility anchor point's IP address as the alternate care-of-address to the correspondent nodes and to the home agent (Step 760). The mobility anchor point address is included in the alternate care-of-address sub-option of the binding update.

It will be recognized that if the mobile node has multiple home addresses then for every home address registration sent to the home agent with the mobility anchor point's address as the care-of-address, another binding update is sent to that mobility anchor point using the same home address. The mobile node should send separate home registration binding updates for each home address. Otherwise, the home agent may form home addresses for the mobile node on each link it is connected to based upon the assumption that the interface identifier is always the same, which may not always be the case.

In order to deregister its existing care-of-address and replace it with a new care-of-address the mobile node should send a binding update to its current mobility anchor point without setting the B bit. When a mobile node changes mobility anchor points, the mobile node sends a binding update to the old mobility anchor point. This binding update performs deregistration by including the old on-link care-of-address (LCOA) and a binding lifetime of zero. Alternatively, the mobile node can send a new mobility anchor point registration with its new care-of-address to replace the old cache entry in the mobility anchor point's binding cache. This binding update will have a short lifetime so that it acts as a mechanism for ensuring that the old mobility anchor point forwards any received packets to the mobile node's new care-of-address.

Figure 9:
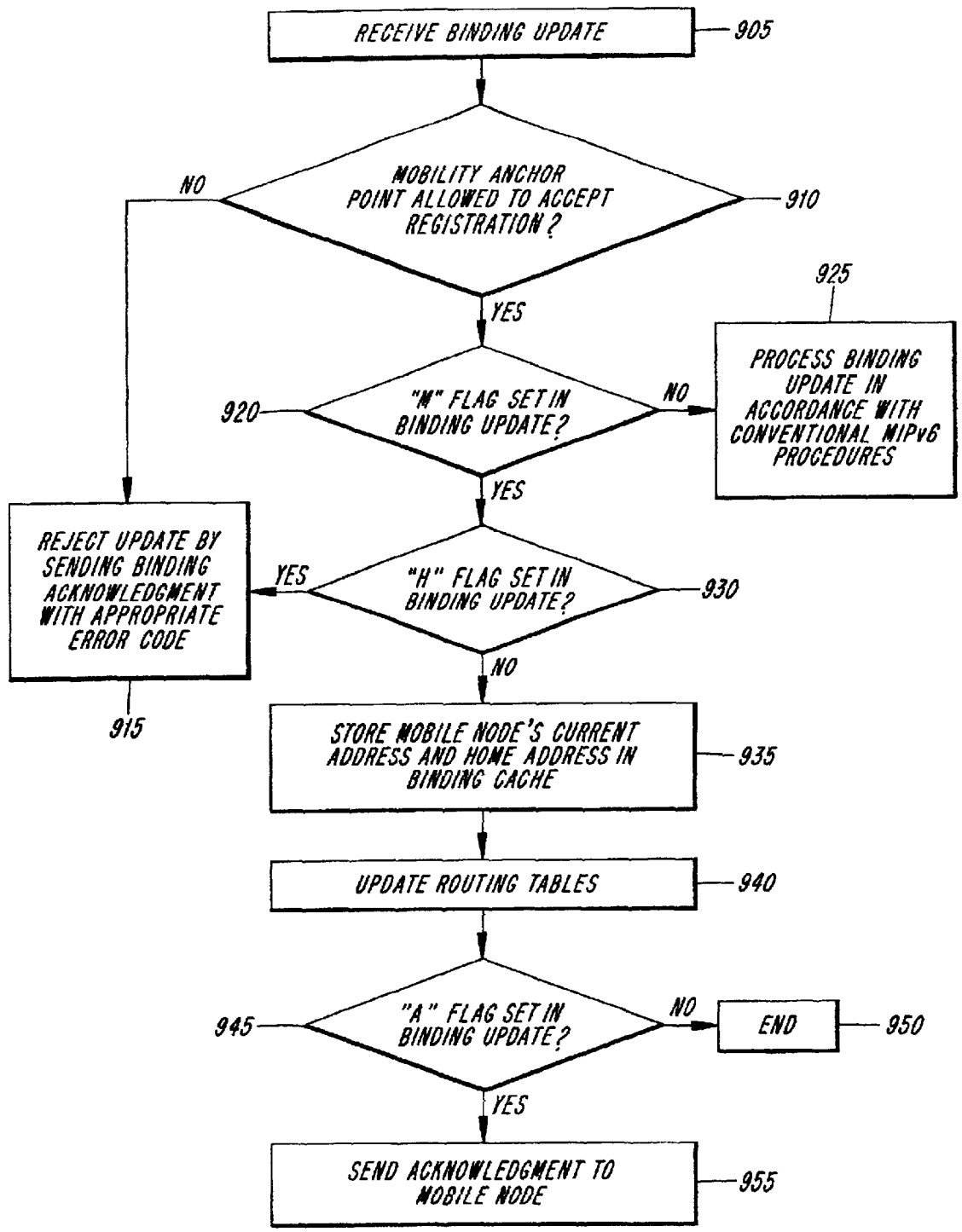
FIG. 9 illustrates a method for processing a binding update registration by a mobility anchor point in accordance with exemplary embodiments of the present invention.

FIG. 9 illustrates a method for processing a binding update registration by a mobility anchor point in accordance with exemplary embodiments of the present invention. When a mobility anchor point receives a binding update (Step 905), the mobility anchor point determines whether the local network policies allow the mobility anchor point to accept the registration (Step 910). If the mobility anchor point is not allowed to accept the registration ("No" path out of decision step 910) the mobility anchor point rejects the update by sending a binding acknowledgement with the appropriate error code (Step 915). If the mobility anchor point is allowed to accept the registration ("Yes" path out of decision step 910) then the mobility anchor point determines whether the M flag is set in the binding update (Step 920). If the mobility anchor point determines that the M flag is not set in the binding update ("No" path out of decision step 920) then the mobility anchor point processes the binding update in accordance with conventional MIPv6 procedures (Step 925). If the mobility anchor point determines that the M flag is set in the binding update ("Yes" path out of decision step 920) then the mobility anchor point determines whether H flag in the binding update is set (Step 930), which indicates that the binding update is intended as a home registration.

If the H flag in the binding update is set ("Yes" path out of decision step 930) the mobility anchor point will reject the update by sending a binding acknowledgement with the appropriate error code (Step 915). If, however, the H flag is not set in the binding update ("No" path out of decision step 930) then the mobility anchor point stores the mobile node's current on-link care-of-address (LCOA) and home address in the binding cache (Step 935) and updates its routing tables (Step 940). Next, the mobility anchor point determines whether the A flag in the binding update has been set (Step 945), thereby indicating that the mobile node has requested acknowledgement of its registration. If the A flag in the binding update is not set ("No" path out of decision step 945) then the registration process ends for the mobility anchor point (Step 950). If, however, the A flag in the binding update is set ("Yes" path out of decision step 945) then the mobility anchor point sends an acknowledgement to the mobile node (Step 955).

Figure 10:
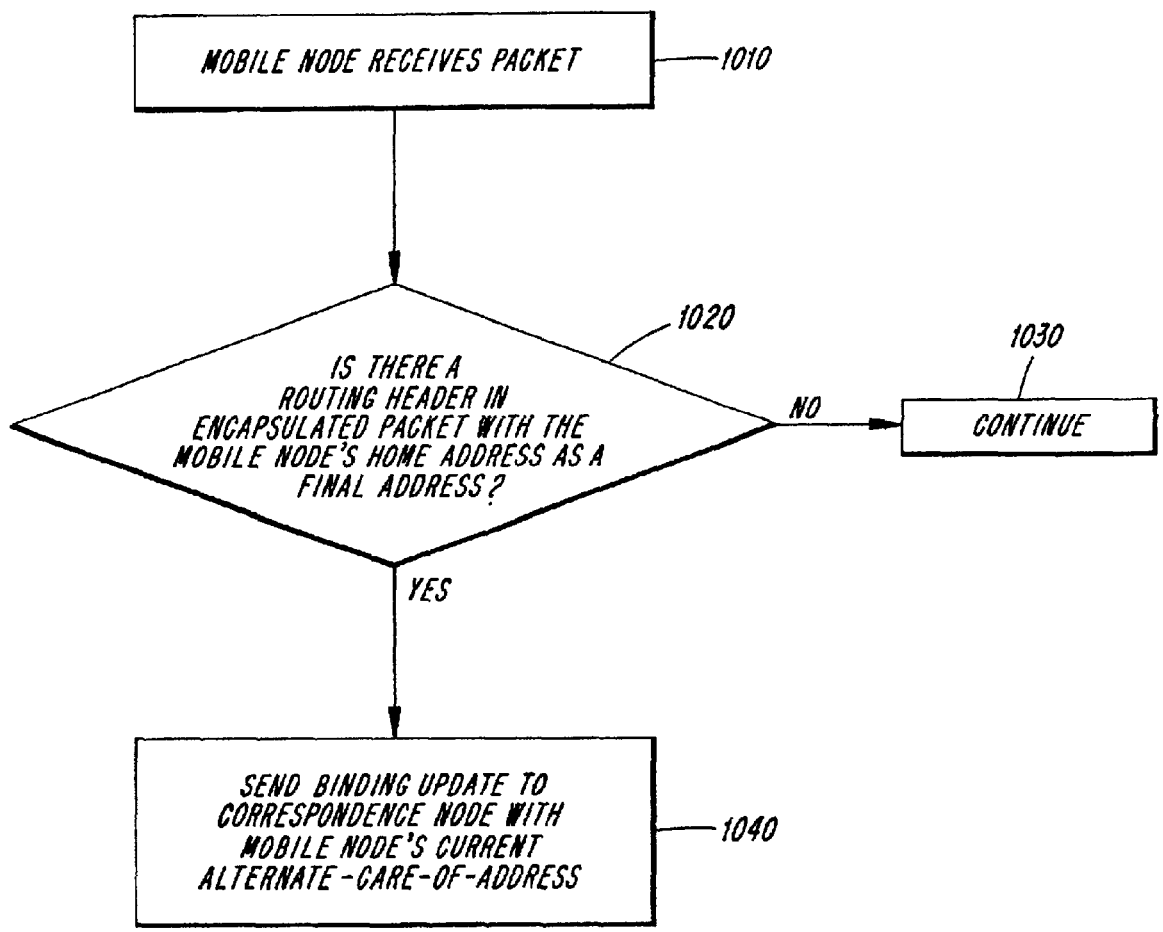
FIG. 10 illustrates a method for processing received packets by a mobile node in accordance with exemplary embodiments of the present invention.

FIG. 10 illustrates a method for processing received packets by a mobile node for optimal routing in accordance with exemplary embodiments of the present invention. When a mobile node receives a packet (Step 1010), the mobile node determines whether there is a routing header in the encapsulated packet with the mobile node's home address as the final address (Step 1020). A routing header in the encapsulated packet with the mobile node's home address as the final address indicates that the node which sent the packet does not have the mobile node's current care of address. Accordingly, if there is not a routing header in the encapsulated packet with the mobile node's home address as the final address ("No" path out of decision step 1020) then the mobile node continues conventional processing of the packet. If, however, there is a routing header in the encapsulated packet with the mobile node's home address as a final address ("Yes" path out of decision step 1020) the mobile sends a binding update to the correspondent node with the mobile node current alternate care-of-address (Step 1040), thereby allowing the correspondent node to send its packets directly to the mobile node through the mobility anchor point without having to tunnel them first through the home agent.

Figure 11:
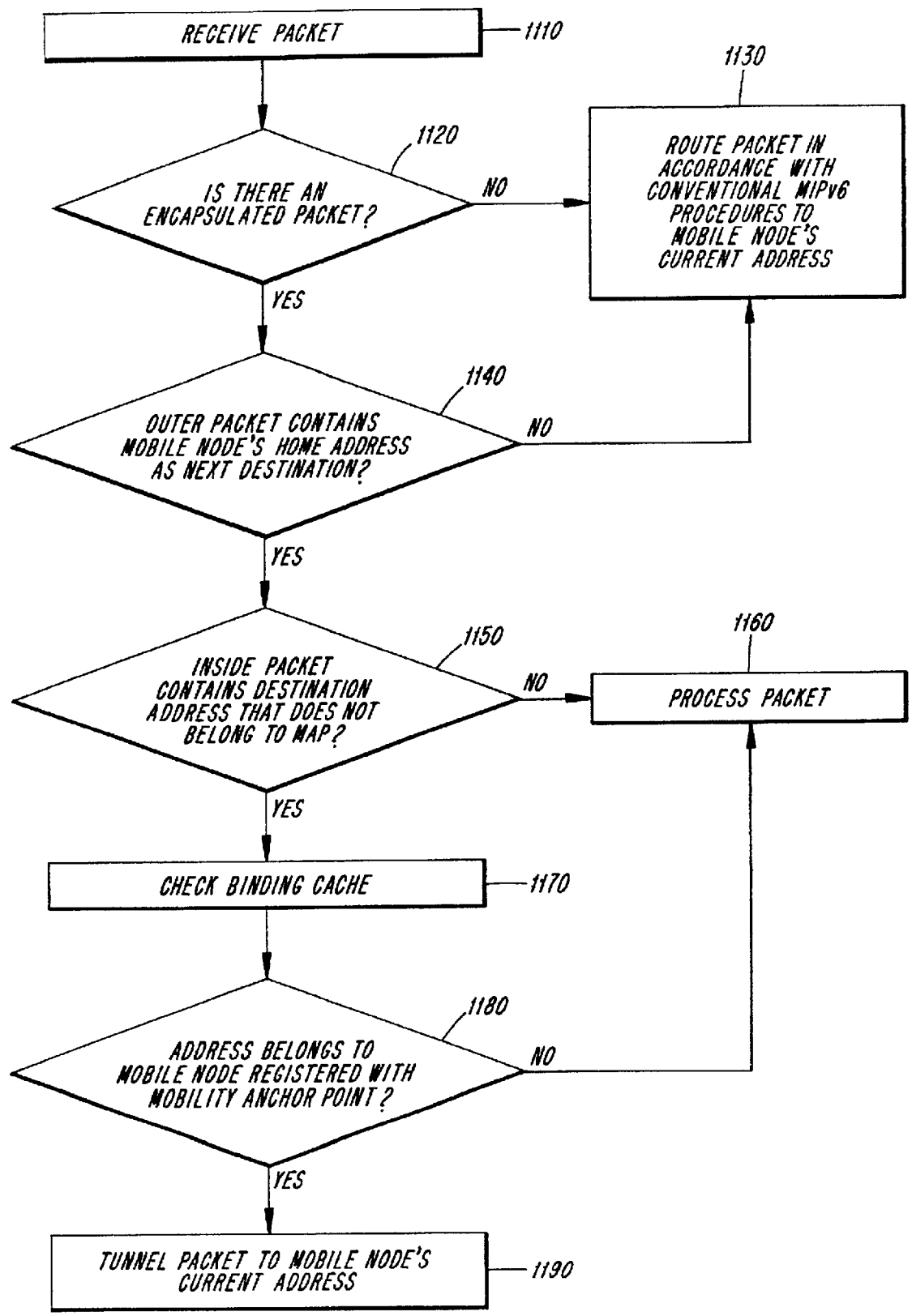
FIG. 11 illustrates a method for processing received packets by a mobility anchor point in accordance with exemplary embodiments of the present invention.

FIG. 11 illustrates a method for processing received packets by a mobility anchor point in accordance with exemplary embodiments of the present invention. When a mobility anchor point receives a packet (Step 1110) the mobility anchor point determines if there is an encapsulated packet (Step 1120). If it is determined that there is not an encapsulated packet ("No" path out of decision step 1120) then the mobility anchor point routes the packet in accordance with conventional MIPv6 procedures to the mobile node's current on-link care-of-address (LCOA) (Step 1130). If it is determined that there is an encapsulated packet ("Yes" path out of decision step 1120) then the mobility anchor point determines whether the outer packet contains the mobile node's home address as the next destination (Step 1140). If the outer packet does not contain the mobile node's home address as the next destination ("No" path out of decision step 1140) then the mobility anchor point routes the packet in accordance with conventional MIPv6 procedures to the mobile node's current address (Step 1130).

If the outer packet contains the mobile node's home address as the next destination ("Yes" path out of decision step 1140) then the mobility anchor point determines whether the inside packet contains a destination address that does not belong to the mobility anchor point (Step 1150). If the inside packet contains a destination address that belongs to the mobility anchor point ("No" path out of decision step 1150) then the mobility anchor point processes the packet in accordance with conventional procedures (Step 1160). If, however, the inside packet contains a destination address that does not belong to the mobility anchor point ("Yes" path out of decision step 1150) then the mobility anchor point checks its binding cache (Step 1170) and determines whether the address belongs to a mobile node registered with the mobility anchor point (Step 1180). If the address does not belong to a mobile node registered with the mobility anchor point ("No" path out of decision step 1180) then the mobility anchor point processes the packet in accordance with conventional procedures (Step 1160). If the address does belong to a mobile node registered with a mobility anchor point ("Yes" path out of decision step 1180) then the mobility anchor point tunnels the packet to the mobile node's current address (Step 1190).

It will be recognized that if the home agent tunnels the packets with addresses other than the home address, e.g., site-local, organization-local or multicast, of which the mobility anchor point has no knowledge the above method will not work correctly. If the home agent uses such an address, the home agent adds a routing header to the outer packet having one of the home addresses for which the mobile node has sent a binding update as a final destination. This enables the mobility anchor point to tunnel the packet to the correct destination, i.e., the mobile node's on-link address (LCOA).

Now that the general operation of a network which includes a mobility anchor point has been described, various applications of the present invention are presented below to highlight the advantageous characteristics of the present invention. One application of the present invention is achieving fast handoffs. Fast handoffs address the need to achieve near seamless mobile IP handoffs when a mobile node changes its care-of-address. In accordance with exemplary embodiments of the present invention fast handoffs are achieved by bicasting packets to anticipate the mobile node's movement and to speed up handoffs by sending a copy of the data to the location which the mobile node is moving into.

When a mobile node determines that it is moving out of the domain of a particular mobility anchor point, the mobile node should send a binding update to the current mobility anchor point with the M flag set, thereby indicating a mobility anchor point registration, and the B flag set, thereby indicating that bicasting is required by the mobile node. In addition, the lifetime of the bicasting should be set to no more than 10 seconds to limit the load imposed on the network by the bicasting. The source address of the binding update will be the mobile node's current on-link care-of-address.

The binding update will also include the mobile node's future care-of-address, i.e., the care-of-address associated with the mobile node's future on-link address. There are several methods for obtaining the care-of-address for the mobility anchor point whose domain the mobile node is moving into. In accordance with one embodiment of the present invention, since the mobile node is moving within radio range of an access router which is broadcasting router advertisements, the mobile node can use its current mobility anchor point or select a new mobility anchor point using the router advertisements received from the anticipated access router. However, some wireless/cellular technologies do not allow a mobile node to be connected to multiple wireless access points contemporaneously. In these networks, router advertisements associated with an access router which it is anticipated that the mobile node will handoff to will be provided to the mobile node through the access router which the mobile node is being handed off from. The mobile node can then perform registration with a mobility anchor point associated with the new access router through the mobile node's current access router.

Upon receiving the binding update, the mobile node's current mobility anchor point updates its binding cache and routing table to allow all incoming packets to the mobile node to be tunneled to both its existing address in the binding cache and the new care-of-address specified in the binding update. The mobility anchor point will continue this bicasting until either a deregistration of the mobile node's current care-of-address is received or until the bicasting lifetime has expired. Accordingly, once a successful handoff has been performed, the mobile node is deregistered from the bicasting mobility anchor point which ceases the bicasting of received packets.

Another application of the present invention is load sharing among multiple active care-of-addresses. To begin load sharing a mobile node informs its current mobility anchor point of all of its current care-of-addresses. The mobile node then sends a binding update to the mobility anchor point indicating that the mobile node wishes to implement load sharing. Accordingly, the mobile node sets the load sharing bit and the bicasting bit when it wants to have the mobility anchor point implement load sharing. It will be recognized that the distribution of the load across the multiple care-of-addresses depends upon the resources available over the links through which the mobile node can be reached corresponding to the alternate care-of-addresses. One skilled in the art will recognize that there are several existing protocols which can be used by the mobility anchor point router to gain information regarding the resources available on the different paths to a node, e.g., Open Shortest Path First (OSPF) and Simple Network Management Protocol (SNMP).

In accordance with another exemplary embodiment of the present invention, the mobile node can supply information in its Binding Update to the mobility anchor point to request a certain connection be moved to one of its addresses. This information identifies the connection and the mobile node's IP address to which the connection should be moved. Connection identification can be provided using the flow label in the IPv6 header, a combination of the IP address and port numbers or a combination of the IP address and security parameter index (SPI) when IP security (IPsec) is used. Such information can be encoded in the Binding Update as a Binding Update Sub-Option.

Although exemplary embodiments of the present invention have been described above as a mobile node registering with a single mobility anchor point at a time, it will be recognized that to use the network bandwidth more efficiently a mobile node may register with more than one mobility anchor point simultaneously and use each mobility anchor point for a specific group of correspondent nodes. For example, referring now to FIG. 3, if a correspondent node exists on the same link as mobile node 305, and if access router 310 includes mobility anchor point functionality, it may be more efficient for the mobile node to use access router 310 for communicating with the correspondent node and to use mobility anchor point 375 to communicate with correspondent node 335.

The present invention has been described with reference to a number aspects and various exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. A method for routing packets to a mobile node comprising the steps of:

providing an address update, including a regional care-of-address associated with the mobile node, to a node communicating with the mobile node;

sending packets, from the node communicating with the mobile node, to a node associated with the regional care-of-address;

receiving packets at the node associated with the regional care-of-address;

determining, at the node associated with the regional care-of-address, a current address of the mobile node;

routing the received packets to a node associated with the current address of the mobile node;

forwarding packets, from the node associated with the current address, to the mobile node; wherein the packets are sent between the node communicating with the mobile node and the mobile node in accordance with mobile Internet Protocol version 6 (MIPv6) protocol;

sending a message, from the mobile node to the node associated with the mobile node's regional care-of-address, requesting that packets be routed to the mobile node's current address and at least another current address of the mobile node;

routing a first group of packets, from the node associated with the mobile node's regional care-of-address, to a node associated with the mobile node's current address; and routing a second group of packets, from the node associated with the mobile node's regional care-of-address, to a node associated with the at least another one of the mobile node's current addresses.

2. The method of claim 1, wherein the node associated with the regional care-of-address implements mobility anchor point functionality.

3. The method of claim 1, wherein the node associated with the current address is an access router.

4. The method of claim 1, further comprising the step of: receiving a message, from the node associated with the mobile node's current address, by the mobile node, wherein the message indicates the availability of nodes which can be used as regional care-of-addresses for the mobile node.

5. The method of claim 4, wherein the nodes which can be used as regional care-of-addresses for the mobile node have mobility anchor point functionallty and wherein the message is a router advertisement containing a mobility anchor point option.

6. The method of claim 4, further comprising the step of: receiving the message by the node associated with the mobile node's current address, wherein the message is received by the node associated with the mobile node's current address via a hierarchy of routers.

7. The method of claim 4, further comprising the step of: selecting, by the mobile node, a new regional care-of-address based upon information contained in the message.

8. The method of claim 7, wherein the new regional care-of-address is selected based upon one of a distance of a node associated with the new regional care-of-address and the mobile node and a preference for the node associated with the new regional care-of-address.

9. The method of claim 8, wherein the preference for the node associated with the new regional care-of-address is based upon one of network loading, network failures and local network policies.

10. The method of claim 1, wherein the packets are sent from the node communicating with the mobile node to the mobile node without being routed by a home agent associated with the mobile node.

11. The method of claim 1, further comprising the steps of:

sending an update message from the mobile node to the node associated with the mobile node's regional care-of-address, wherein the update message includes an address associated with a node which the mobile node will be using as its new regional care-of-address;

receiving packets by the node associated with the mobile node's regional care-of-address; and forwarding the received packets to the node associated with the mobile node's current address and to the node associated with the mobile node's new regional care-of-address.

12. The method of claim 11, wherein the update message is a binding update and wherein the binding update includes an indication that the mobile node is registering with the node associated with the mobile node's new regional care-of-address, that the mobile node requires bi-casting of packets.

13. The method of claim 1, further comprising the step of: determining, by the node associated with the mobile node's regional care-of-address, a load on the node associated with the mobile node's current address and a load on the node associated with the at least another one of the mobile node's current addresses, wherein packets are selected for the first group or the second group based on the determined loads.

14. The method of claim 1, wherein the message is a binding update.

15. A network comprising:
a mobile node;
a node communicating with the mobile node, wherein the mobile node provides an address update, including a regional care-of-address associated with the mobile node, to the node communicating with the mobile node;
a node associated with the regional care-of-address, wherein the node communicating with the mobile node sends packets to the node associated with the regional care-of-address;
a node associated with a current address of the mobile node, wherein the node associated with the current address of the mobile node receives packets from the node associated with the regional care-of-address of the mobile node and sends the received packets to the mobile node;
means for sending a message to the node associated with the mobile node's regional care-of-address requesting that packets be routed to the mobile node's current address and at least another current address of the mobile node;
means for routing a first group of packets, from the node associated with the mobile node's regional care-of-address, to a node associated with the mobile node's current address; and
means for routing a second group of packets, from the node associated with the mobile node's regional care-of-address, to a node associated with the at least another one of the mobile node's current addresses;
wherein the network operates in accordance with mobile Internet Protocol version 6 (MIPv6) protocol.

16. The network of claim 15, wherein the node associated with the regional care-of-address implements mobility anchor point functionality.

17. The network of claim 15, wherein the node associated with the current address is an access router.

18. The network of claim 15, further comprising:
means for receiving a message, from the node associated with the mobile node's current address, by the mobile node,
wherein the message indicates the availability of nodes which can be used as regional care-of-addresses for the mobile node.

19. The network of claim 18, wherein the nodes which can be used as regional care-of-addresses for the mobile node have mobility anchor point functionality and wherein the message is a router advertisement containing a mobility anchor point option.

20. The network of claim 18, further comprising: means for receiving the message by the node associated with the mobile node's current address, wherein the message is received by the node associated with the mobile node's current address via a hierarchy of routers.

21. The network of claim 18, further comprising: means for selecting, by the mobile node, a new regional care-of-address based upon information contained in the message.

22. The network of claim 21, wherein the new regional care-of-address is selected based upon one of a distance of a node associated with the new regional care-of-address and the mobile node and a preference for the node associated with the new regional care-of-address.

23. The network of claim 22, wherein the preference for the node associated with the new regional care-of-address is based upon one of network loading, network failures and local network policies.

24. The network of claim 15, wherein the packets are sent from the node communicating with the mobile node to the mobile node without being routed by a home agent associated with the mobile node.

25. The network of claim 15, further comprising:
means for sending an update message from the mobile node to the node associated with the mobile node's regional care-of-address, wherein the update message includes an address associated with a node which the mobile node will be using as its new regional care-of-address;
means for receiving packets by the node associated with the mobile node's regional care-of-address; and
means for forwarding the received packets to the node associated with the mobile node's current address and to the node associated with the mobile node's new regional care-of-address.

26. The network of claim 25, wherein the update message is a binding update and wherein the binding update includes an indication that the mobile node is registering with the node associated with the mobile node's new regional care-of-address, that the mobile node requires bi-casting of packets and the length of time for which bi-casting of packets is required.

27. The network of claim 15, further comprising: means for determining, by the node associated with the mobile node's regional care-of-address, a load on the node associated with the mobile node's current address and a load on the node associated with the at least another one of the mobile node's current addresses, wherein packets are selected for the first group or the second group based on the determined loads.

28. The network of claim 15, wherein the message is a binding update.

* * * * *